June 14, 1955 A. M. SKELLETT 2,710,890

DOT SCREEN TYPE COLOR TELEVISION APPARATUS

Filed June 1, 1950 2 Sheets-Sheet 1

Inventor
ALBERT M. SKELLETT

By John J. Rogan

Attorney

June 14, 1955 A. M. SKELLETT 2,710,890

DOT SCREEN TYPE COLOR TELEVISION APPARATUS

Filed June 1, 1950 2 Sheets-Sheet 2

Inventor
ALBERT M. SKELLETT

By

John J. Logan
Attorney

1

2,710,890

DOT-SCREEN TYPE COLOR TELEVISION APPARATUS

Albert M. Skellett, Madison, N. J., assignor to National Union Radio Corporation, Orange, N. J., a corporation of Delaware Application June 1, 1950, Serial No. 165,523

24 Claims. (Cl. 178—5.4)

This invention relates to television apparatus, and more particularly to improvements in apparatus for displaying colored reproductions of an original subject matter.

A principal object of the invention is to provide a novel form of cathode-ray tube for producing signal-controlled multi-colored displays.

Another object is to provide an improved multi-color television image reproducing tube.

A further object is to provide an improved multi-color television system.

A feature of the invention relates to a cathode-ray tube having a novel signal-controlled multi-beam arrangement for cooperation with a multi-color dot mosaic phosphor screen.

Another feature relates to a cathode-ray tube having a phosphor screen provided with a mosaic of multi-color elemental areas, each mosaic area constituted of a plurality of discrete phosphor dots of different color response, in conjunction with a specially apertured mask and a gun for developing a plural section cathode-ray beam, and with means to selectively control each beam section in synchronism with respective applied color signals.

A further feature relates to an improved cathode-ray tube for producing television or othter displays in multi-color, while employing a single electron gun.

A further feature relates to a cathode-ray tube for multi-color television and the like, employing a novel beam sub-division arrangement and control means therefor, whereby the desired colored phosphor on an image-reproducing screen can be selectively excited in synchronism with the corresponding scanning of a multi-color subject at a transmitter.

A still further feature relates to the novel organization, arrangement and relative location and interconnection of parts which cooperate to provide a simplified and improved cathode-ray tube for multi-color image reproduction.

Other features and advantages not particularly enumerated, will be apparent after a consideration of the following detailed descriptions and the appended claims when taken in conjunction with the accompanying drawing.

Figure 2:
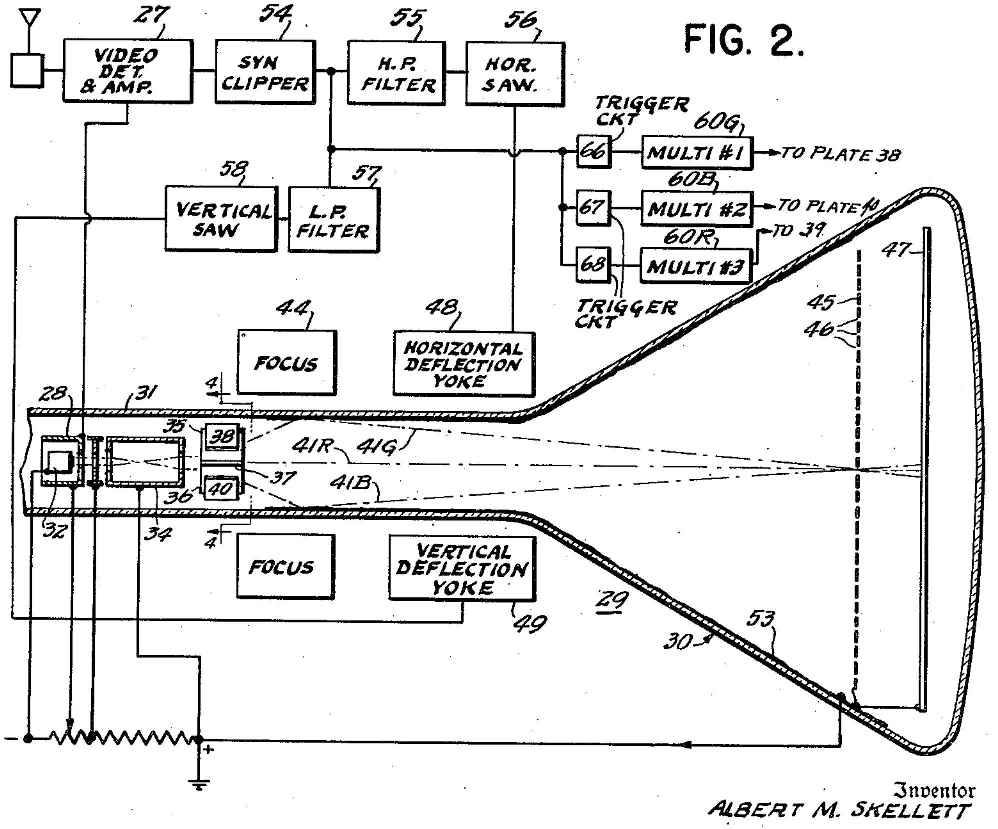
Fig. 2 is a schematic diagram, partly structural, of a television receiver according to the invention.
Figures 3, 3A, 3B, 3C, 3D:
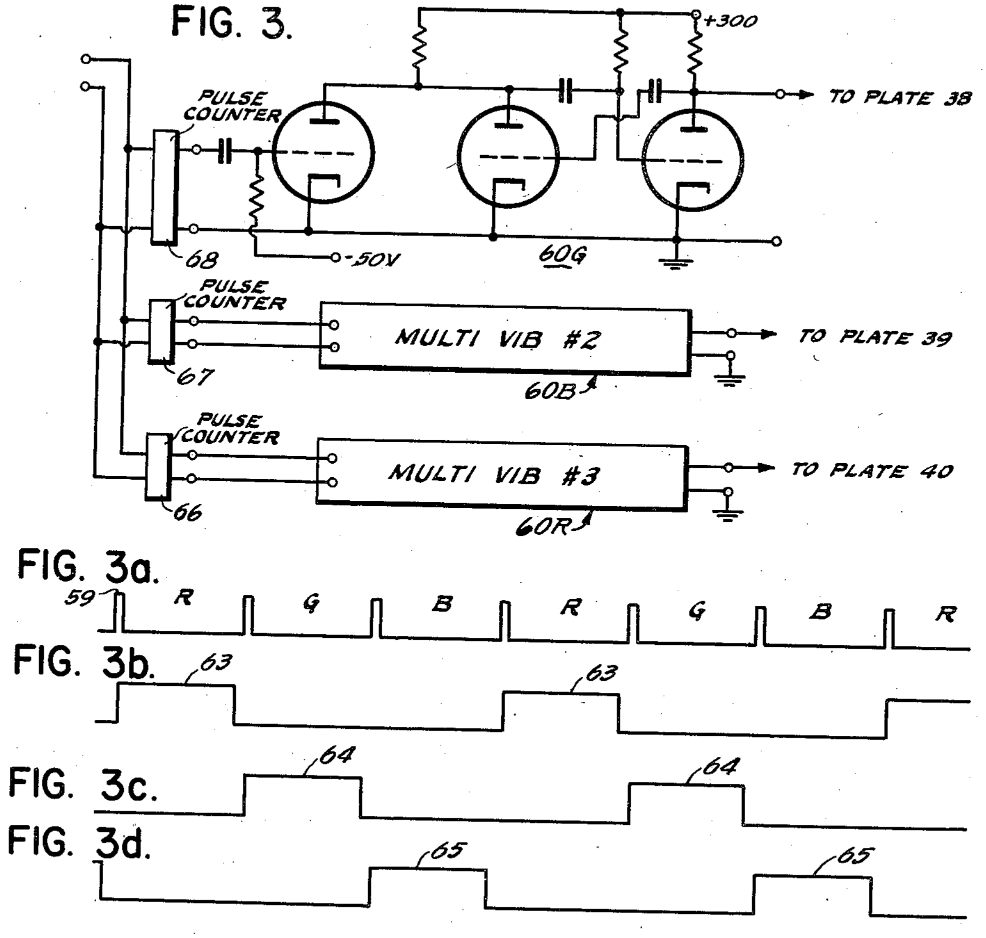
Fig. 3 is a schematic diagram of a typical color registration control used in the receiver of Fig. 2.

Figs. 3*a*, 3*b*, 3*c* and 3*d* are respective wave diagrams explanatory of the operation of Figs. 2 and 3.

Figure 4:
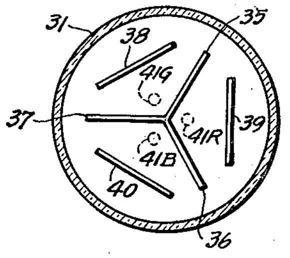

Fig. 4 is a sectional view of Fig. 2, taken along the line 4—4 thereof.

Figure 5:
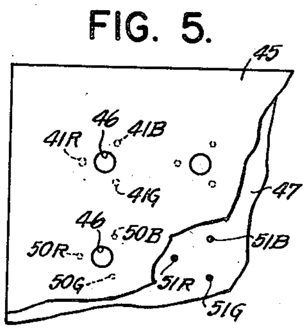

Fig. 5 is an enlarged front view of part of the masking electrode and color screen elements of Fig. 2.

2

Figure 6:
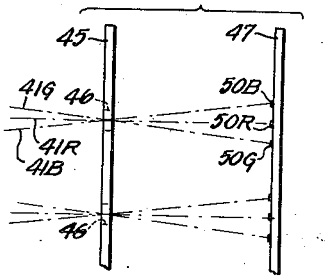

Fig. 6 is an edge view of Fig. 5.

Various methods of reproducing television images in color have been proposed heretofore. In the main, one of the most serious objections to these prior methods is the difficulty of obtaining registration between the individual electric signals representing color components, and the corresponding color-sensitive phosphors on the reproducing screen. In accordance with the present invention, the reproducing screen is formed with a mosaic of tri-color dots and with each set of dots arranged in predetermined symmetric orientation with respect to a corresponding opening in a masking plate. A single electron gun is provided for developing an electron beam which is subdivided into a plurality of beam sections. The subdivided beam sections are individually controlled by respective signal-controlled deflector elements so that at any given instant of time, only one section of the beam is effective to excite its corresponding colored dot area on the mosaic screen. This effect is achieved by employing a conventional beam-focussing arrangement which is capable of selectively focussing the three sections of the subdivided beam on the respective colored phosphor dots on the phosphor screen, even though the beam sections are also subjected to the usual coordinate scanning motions over the phosphor screen. The invention is not limited to any particular method of scanning, that is to say, it can be equally well applied to so-called sequential-frame scanning, to sequential-line scanning, or to sequential-dot scanning. Merely for simplicity in explanation, the invention will be described as applied to a system employing sequential-frame scanning. In that type of system, the subject matter at the transmitter is scanned first completely for one color, for example red; then completely for another color, for example blue; and then completely for a third color, for example green. In accordance with standard television transmitting technique, there is transmitted at the end of each completed frame, the well-known frame synchronizing pulse. These pulses, in accordance with the present invention, are used to control the synchronization of effectiveness of the appropriate section of a three-section beam in a receiving cathode-ray tube so as to excite only the corresponding colored phosphor dots on the receiving reproducing screen.

Figure 1:
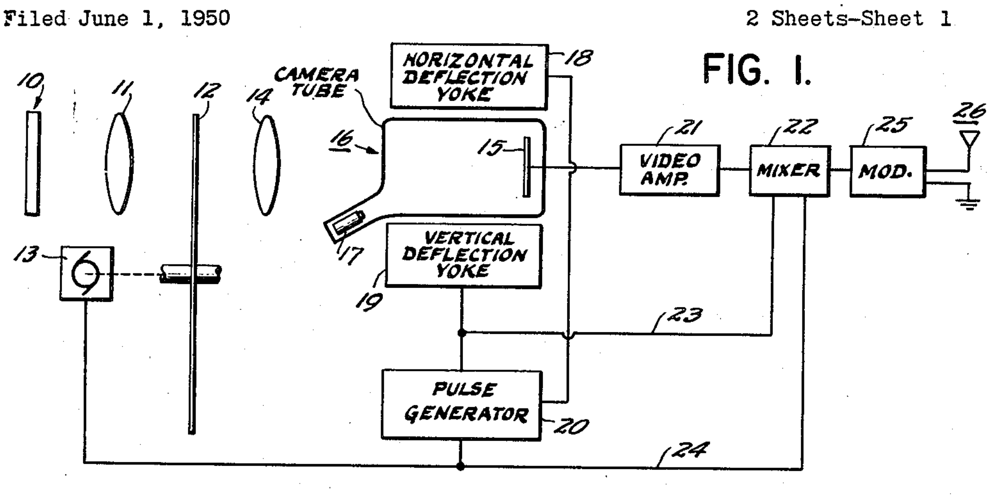
Fig. 1 is a generalized schematic diagram of television transmission apparatus forming part of an image-reproducing system according to the invention.

Thus, in Fig. 1, the numeral 10 represents any subject matter whose color values are to be transmitted and reproduced. By means of a suitable optical system 11, an image of this subject is projected upon the color analyzer 12 which may be of any well-known type comprising, for example, a light transparent disc formed of equi-angular sectors. For example, in a three-color system, this disc may be constituted of three 120° sectors, one of which is transparent to red light, the second of which is transparent to blue light, and the third of which is transparent to green light. The disc 12 is kept in continuous rotation at a fixed speed by means of a suitable motor 13. An additional optical system 14 is provided for projecting the light, after passage through the color filter wheel 12, upon the mosaic 15 of any well-known television transmitting analyzing tube 16, such for example as an "Iconoscope," an "Image Dissector," or the like. In accordance with well-known principles, these analyzing tubes have the usual electron gun 17 and focussing and beam-deflecting electrodes (not shown) for subjecting the mosaic 15 to a successive point-by-point scanning action. The coordinate deflecting action is controlled by the well-known horizontal scan control 18 for causing the beam to traverse the screen 15 in successive horizontal lines. When the complete screen has been scanned, the usual vertical scan control 19 takes effect to restore the beam to its original position at the beginning of the first scanned line. Also in accordance with standard practice, the horizontal and vertical scan controls 18 and 19 are in turn controlled by a pulse generator 20 which may also be connected through suitable circuits to control the speed of motor 13. For a detailed description of such a transmitter, reference may be had to "Television," volume IV, January 1947, published by RCA Review, Princeton, New Jersey. The video signals from the tube 16 are amplified in a suitable video amplifier 21, and are applied to a mixer 22 to which is also applied the horizontal scan synchronizing pulses via conductor 23 and also the vertical scan or frame synchronizing pulses via the conductor 24. The output of the mixer 22 is then applied to any suitable modulator 25 which feeds any suitable radio transmitter represented schematically by the numeral 26.

At the receiving end of the system (Fig. 2), the video signals and the synchronizing pulses are detected in a suitable amplifier and detector 27, and the detected video signals are applied to the control grid 28 of the image-reproducing tube 29 that forms one feature of the invention. This tube may comprise the usual evacuated enclosing envelope 30 having a neck portion 31 in which is located a conventional electron gun, comprising for example the electron-emitting cathode 32, the control grid 28, and the accelerating anode system 34 including for example the usual 1st and 2nd anodes. Located adjacent the exit end of the gun is a beam subdividing arrangement, comprising a set of three metal plates 35, 36, 37 (see Fig. 4), arranged in substantial Y shape to form 120° angles between each adjacent pair of plates. Located in symmetric spaced relation to each adjacent pair of beam dividing plates are three other beam deflector plates 38, 39 and 40. By means of the plates 35, 36, 37, the beam from the electron gun is thus divided into three symmetric beam sections 41R, 41G, 41B, represented by the dot-dash lines. By means of suitable potentials applied to the various electrodes of the electron gun, the beam emerging from the gun is a converging beam which converges on the longitudinal axis of the tube. Should the same magnitude of positive potential be simultaneously applied to the plates 38, 39 and 40, the trisected beam would be deflected as indicated in Figs. 2 and 4, with the three beam sections having respective trajectories symmetrically located at the same angle with respect to the central longitudinal axis of the tube, and all symmetrically converging towards the said axis. If, however, two of the plates, for example plates 38 and 39, have a more positive potential applied thereto than the third plate 40, the corresponding beam sections 41B and 41G will be deflected to a greater extent as indicated by the dotted line trajectories, so that they strike the inner coated wall of the neck 31. However the remaining beam section 41R will continue along the dot-dash line trajectory as shown in Fig. 2. A common focussing yoke 44 of the usual design surrounds the neck 31 adjacent the trisecting plates, so as to focus only the selected section of the trisected beam in a corresponding spot in the plane of a multi-apertured masking plate 45. This plate 45 consists of a multiplicity of small round apertures 46 (Figs. 5, 6), through which the focussed beam successively passes, and whence it diverges upon a corresponding area of the phosphor screen 47. Following the focussing yoke 44 is the usual horizontal beam-deflecting system 48 and the usual vertical beam-deflecting system 49 for subjecting the focus beam in a scanning pattern in synchronism with the scanning of the mosaic 15 at the transmitter.

From the foregoing it will be seen that if the three plates 38, 39 and 40 are all simultaneously excited by the same magnitude of positive potential which is just sufficient to bend them into the focus field of yoke 44, the three sections of the beam diverge outwardly at a comparatively small angle with respect to the longitudinal axis of the tube, and with the beam trajectories located on three symmetric paths around the said longitudinal axis corresponding to the slanting edges of a triangular pyramid. Under this condition, the focussing unit 44 focusses the three separate beam sections as three separate dots on the corresponding area of the screen 47 allotted to a corresponding one of the openings of the apertures in the masking plate 45. By suitable adjustment of the various potentials and by suitable adjustment of the spacing between the masking plates 45 and 47, the three focussed beam sections, under the above assumed condition, and after passage through a particular aperture, for example aperture 46, strike the screen 47 respectively in three minute spots which are symmetrically distributed around the center of the said aperture 46. At each of these spots there has been previously deposited on the screen 47 a corresponding colored phosphor; for example at one spot there may be applied a red phosphor dot 50R, at the second spot there may be applied a green phosphor dot 50G, and at the third spot there may be applied a blue phosphor dot 50B. In other words, if all three beam sections are simultaneously focussed through any given opening in the masking plate 45, each section will strike only its corresponding colored phosphor dot 50R, 50G, 50B, in the rear of this opening.

In accordance with one feature of the invention however, only one of these beam sections is arranged to be focussed at any given instant on the screen 47, this being controlled by applying a different amount of positive potential to the particular deflector element corresponding to the beam which is to be effective at that given instant. For example, assume that at any given instant, the area behind aperture 46 is being scanned, and also assume that at that instant a red signal is to be reproduced. By suitable circuit arrangements to be described, the plate 40 will then have applied thereto a less positive potential than do the plates 38 and 39. Consequently, the beam sections 41G and 41B will be deflected outwardly through a much wider angle, and will strike the neck 31. This neck can be coated with the usual conductive coating 53 of "Aquadag" or the like, which can be connected to the second anode potential of the gun 34. Consequently, neither of these beam sections 41G, nor 41B, comes under the focussing action of the focus yoke 44. However, the remaining beam section 41R being less divergent because of the lower positive potential applied to plate 40, does come under the focussing action of the yoke 44, and it proceeds along its focussed trajectory and passes through the appropriate aperture 46 so that it impinges upon the red phosphor dot 50R. It will be clear, therefore, that if at this particular instant a green area were required to be reproduced, the plates 39 and 40 would have applied thereto a higher positive potential than plate 38, with the result that the beam sections 41R and 41B would be deflected outwardly to the neck of the tube, and would be unaffected by the focus yoke 44. However, the remaining beam section 41G would be less deflected, and would come within the focussing action of that yoke, whereupon this particular beam section would be focussed upon the appropriate opening 46, and would emerge therethrough so as to strike the green area 50G. Likewise, if at the instant under consideration, a blue dot were required to be reproduced, only the beam section 41B will be deflected to an extent where it comes under the action of the focussing yoke 44, causing it to strike the corresponding blue phosphor dot 50B. Therefore, by this arrangement, any one of the three tricolor dot areas corresponding to each of the openings 46, can be effectively and selectively excited.

While the invention is not limited to any particular manner of controlling the selective energization of the plates 38, 39, 40, so as to subject only one section to the action of the focussing yoke 44, there is shown in Figs. 2 and 3, a typical arrangement for this purpose. The output of the video amplifier 27 can also be applied to a pulse clipper 54 which clips and selects the various horizontal and frame synchronizing pulses. The horizontal or line synchronizing pulses are applied to a high-pass filter 55, and thence to a horizontal saw-tooth generator 56, to generate appropriate saw-tooth waves which are applied to the horizontal beam scanning system 48 to cause the cathode-ray beam to execute the successive horizontal linear scans across the screen 47. The output of the clipper 54 is also applied to a low-pass filter 57, and thence to a saw-tooth wave generator 58 which is connected to the vertical deflection system 49, to control the vertical deflection of the beam. At the end of each complete raster scanning, there is produced the conventional frame synchronizing pulse 59 (Fig. 3*a*). These pulses can be applied to control sequentially and cyclically a set of three multi-vibrators 60R, 60G, 60B. The output of multi-vibrator 60G can be connected to plate 38; the output of multi-vibrator 60B can be connected to plate 39; and the output of multi-vibrator 60R can be connected to plate 40.

In order that the multi-vibrators may be sequentially and cyclically rendered effective, each for a duration corresponding to the complete frame scanning period, the multi-vibrator 60R which controls the red beam section is triggered in response to the first pulse 59 of each set of three successive frame synchronizing pulses to produse a square-topped output wave 63 (Fig. 3*b*) to render the plate 38 alone effective to bring the red beam section 41 under the action of focus yoke 44. The multi-vibrator 60R produces no corresponding square wave output or is quiescent during the next two successive complete scannings corresponding to the green and blue reproductions. After the multi-vibrator 60R has become quiescent in response to the red scannings, the next pulse 59 triggers multi-vibrator 60G which generates a square-topped output wave 64 which controls the potential of plate 39. The duration of this wave 64 is equal to that of wave 63. Likewise, after multi-vibrator 60G becomes quiescent, the third pulse 59 triggers the multi-vibrator 60B to generate a similar square-topped wave 65 which controls the potential of the plate 40. While any well-known circuit arrangements may be provided for successively triggering the multi-vibrators, a typical arrangement is shown in Fig. 3, wherein the frame synchronizing pulses are applied in parallel to three separate pulse counters 66, 67, 68. The counter 66 triggers the multi-vibrator 60R in response to the first impulse of each set of three; the pulse counter 67 triggers the multi-vibrator 60B in response to two successive pulses of each set of three; and the pulse coutner 68 triggers the multi-vibrator 60G in response to three successive pulses of the set. It will be understood that any other well-known manner of successively triggering the multi-vibrators may be employed, such for example as disclosed in Fig. 9 of my prior Patent #2,293,177, issued August 18, 1942.

It will be clear from the foregoing that the invention is not limited to the scanning of the screen 47 in complete successive frame color scans. For example, if the transmitter shown in Fig. 1 is of the so-called line-sequential type, as disclosed for example in U. S. Patent No. 2,389,646, then appropriate line synchronizing pulses will be transmitted at the end of each scanned line, and these line synchronizing pulses will be applied to the multi-vibrators 60R, 60G, 60B, to synchronize the selection of the particular beam section 41R, 41G, 41B, to correspond with the particular line color that is being scanned at the transmitter.

Likewise, if the transmitter of Fig. 1 is of the so-called dot-sequential type, a synchronizing pulse can be transmitted for each color sampling of each successive dot of the subject 15, and these color sampling pulses can be applied to the multi-vibrators 60R, 60G, 60B, in a similar manner to control the synchronous selection of the particular beam section 41R, 41G, 41B, to correspond with the particular color analysis of each successive spot at the transmitter.

While the invention has been described in connection with a system of the three-color type, it will be understood of course that the same principles may be applied to systems of a greater or less number of colors. In other words, the beam from the gun 34 can be divided into two or more separate sections each allotted to a corresponding color analysis and corresponding to two or more deflector plates similar to plates 38, 39, 40, which can be selectively energized to select the particular section of the beam that is to be effective at any given instant on the corresponding color dot areas of the screen 47.

While certain embodiments have been described herein, it will be understood that various changes and modifications may be made therein without departing from the spirit and scope of the invention.

What is claimed is:

1. Apparatus for producing images in color, comprising in combination a cathode-ray tube having a screen with a multiplicity of sets of color phosphor dots, each set having a plurality of discrete dots of different phosphorescent color response with the dots of each set repeated in similar spacial array, means including a single cathode to develop a plurality of cathode-ray beam sections with each section arranged to be focussed respectively only upon a corresponding dot in each set main deflector elements for all the beam sections for scanning said screen, signal-controlled means responsive to color switching signals applied thereto for selectively displacing all the beam sections except one prior to reaching said main deflecting elements to cause said one beam section alone to be acted upon by the said main deflector elements to selectively excite its corresponding colored phosphor dot in each set, and a single beam intensity control element located between said cathode and said color switching means.

2. Apparatus for producing images in color, comprising in combination a cathode-ray tube having a screen with a multiplicity of sets of colored phosphor dots each set having a plurality of discrete dots of different primary phosphorescent color response with the dots of each set repeated in similar spacial array, means to develop a plurality of cathode-ray beam sections by subdivision of an original single cathode-ray beam, means to focus and deflect said sections so that each section strikes a corresponding phosphor dot in each set, means to selectively render only one beam section effective at a time on said spots, the last-mentioned means including respective and separate beam deflector elements for said beam sections, and color switching signal-controlled means to energize said deflector elements individually and selectively to render a particular beam section effective on its respective dot of each set, and a separate single beam intensity control element acting on said single beam before it is subdivided.

3. Apparatus for producing images in color, comprising in combination a cathode-ray tube having a screen with a multiplicity of sets of phosphor dots, each set having a plurality of discrete dots of different primary phosphorescent color response with the dots of each set repeated in similar spacial array, means to develop a plurality of discrete cathode-ray beam sections by subdivision of an original single cathode-ray beam, means normally tending to focus all said beam sections each respectively on a corresponding dot of a set, means for deflecting at any given instant all except one beam section to bring only said one section into the effective range of said focussing means, and signal-controlled means to which color switching signals are applied for energizing said deflecting means to change the particular beam section which is brought within the effective range of said focussing means.

4. Apparatus for producing images in color, comprising in combination a cathode-ray tube having a screen with a multiplicity of sets of phosphor dots, each set having a plurality of discrete areas of different color response with the dots of each set repeated in similar spacial array, means to develop a plurality of discrete cathode-ray beam sections by subdivision of an original single cathode-ray beam each section normally following a trajectory terminating at a corresponding one of said areas, signal-controlled means to which color switching signals are applied to render each beam section successively effective on its corresponding areas, the last-mentioned means including a multi-perforated baffle member through which the beam sections pass to reach said screen, and individual beam deflector elements for said sections, and a separate beam intensity control electrode located to act on said original beam before subdivision.

5. Apparatus for producing images in color, comprising in combination a cathode-ray tube having a screen with a multiplicity of sets of tri-color phosphor dots with the dots of each set repeated in similar spacial array, means to develop a tri-section cathode-ray beam by subdivision of an original single beam and with each trisected section having a trajectory terminating in a respective dot of each set, a common focussing arrangement for said tri-section beam, means to blank off only two beam sections at a time from reaching the said screen, the last-mentioned means including individual beam deflectors for selectively deflecting only one beam section into the effective range of said focussing means, and a separate beam intensity control electrode located to act on said original beam before it is tri-sected.

6. Apparatus for producing images in color, comprising in combination a cathode-ray tube having a screen with a multiplicity of sets of tri-color phosphor dots with the dots of each set repeated in similar spacial array, means to develop a tri-section cathode-ray beam by subdivision of an original single beam with each tri-sected section having a trajectory terminating in a respective dot of each set, a common focussing arrangement for focussing said beam sections respectively on said dots, and means to blank off only two beam sections at a time from reaching said screen, the last-mentioned means including individual beam deflector elements for selectively deflecting only one beam section at a time into the effective range of said focussing arrangement, a multi-apertured baffle plate located adjacent said screen and having a series of apertures with each aperture allotted to a corresponding set of tri-color dots, and a single beam intensity electrode located to act on said original beam before it is tri-sected.

7. Apparatus for producing images in color, comprising in combination a cathode-ray tube having an image-producing screen, a baffle plate with a multiplicity of apertures each allotted to a corresponding area of said screen, a plurality of sets of phosphor dots one set for each baffle aperture with the dots of each set offset laterally from the margin of the corresponding aperture so that the dots can be excited only by a cathode-ray beam passing through the corresponding baffle aperture at an angle to the plane of the baffle with the dots of each set repeated in similar spacial array, means to develop a plurality of cathode-ray beam sections by subdivision of an original single cathode-ray beam, means for bending said sections so that their trajectories pass through any desired baffle aperture at an angle to terminate on corresponding dots of the associated set, and signal-controlled means to which color switching signals are applied to selectively deflect all except one beam section at a time to cause only said one beam section to reach said baffle and screen.

8. Apparatus for producing images in color, comprising in combination a cathode-ray tube having an image screen, a single electron gun to develop a single cathode-ray beam, means to divide said beam into a plurality of discrete sections, beam-focussing means for all said sections to cause them to symmetrically converge at any given instant towards a common central focussing region beyond which the beam sections again respectively symmetrically diverge to said screen, and individual beam deflector elements for said beam sections and to which color switching signals are applied for selectively controlling the trajectories of said sections whereby only one section at a time impinges on said screen, said screen having a multiplicity of sets of phosphor dots of different phosphorescent color response with the dots of each set repeated in similar spacial array each beam section being arranged to cooperate with only a corresponding one of the dots of each set and a separate single beam-intensity control electrode located to act on said beam before its subdivision.

9. Apparatus for producing images in color, comprising in combination a cathode-ray tube having an image screen with a multiplicity of tri-color phosphor dot sets, each set having its dots arranged symmetrically around a common center with the dots of each set repeated in similar spacial array, a single electron gun, trisecting elements for dividing the beam from said gun into three separate beam sections, a common focussing arrangement for the beam sections, a set of three beam deflector plates symmetrically arranged around said tri-secting elements and each cooperating with an adjacent pair of said tri-secting elements to cause the focussed beam sections to symmetrically converge towards a common area in front of said screen, means to selectively energize any one of said deflector plates in synchronism with received color analysis signals to cause only two of said beam sections to be deflected away from the focussing action of said focussing means while allowing the remaining beam section to reach said screen.

10. A cathode-ray tube comprising an evacuated envelope having in combination a single electron gun for developing a single beam, beam trisecting means symmetrically arranged around the beam to divide the beam from said gun into three discrete symmetrical beam sections, means to focus said sections so that they converge at a common area, an apertured baffle member located with its aperture at said area, an image screen located adjacent said baffle member on the opposite side thereof from the side facing the gun, means between said gun and focussing means to selectively deflect said beam sections to different amounts so that only one beam section at a time is enabled to reach said baffle member a set of three phosphor dots on said screen for each baffle aperture and blanked off by the baffle member except for rays leaving the baffle aperture divergently towards said dots the dots of each set being repeated in similar spacial array, and means including said baffle to cause each beam section to excite only a corresponding dot in said set.

11. A cathode-ray tube comprising an evacuated enclosing envelope having in combination an electron gun at one end for developing an original single beam, a fluorescent screen at the other end, and means located between the gun and the screen comprising in succession beam trisecting means for dividing the beam into three discrete beam sections, individual deflecting means for each of said beam sections to selectively deflect only one section at a time, beam focussing means, and a multi-apertured baffle, said screen having a multiplicity of sets of tri-color dots each set being excited by a respective section of the trisected beam passing through a corresponding baffle aperture, the dots of each set being repeated in similar spacial array said tri-secting means and said individual deflecting means being arranged symmetrically around the original beam and at substantially the same region of the beam trajectory.

12. A cathode-ray tube according to claim 11, in which there is also located between the focus means and said baffle member vertical and horizontal beam deflecting means for deflecting the three beam sections in coordinate scanning motions with respect to said screen.

13. Color television apparatus comprising in combination means to receive television signals having synchronizing signal elements interspersed between color analysis signal elements, a cathode-ray tube having means to develop three discrete cathode-ray beam sections, a focus arrangement for all the beam sections, a fluorescent screen having a multiplicity of sets of dots with the dots in each set symmetrically spaced with the dots of each set being repeated in similar array, individual deflector elements for said beam sections said deflector elements symmetrically surrounding the beam, and means to excite said deflector elements under control of said color analysis signal elements to cause each dot of a set to be excited only by a corresponding one of the cathode-ray beam sections.

14. Color television apparatus comprising in combination means to receive television signals having color switching signal elements interspersed between color analysis signal elements, a cathode-ray tube having means to develop three discrete beam sections, a focus arrangement for said beam sections, a separate beam deflector element for each beam section said deflector elements being symmetrically arranged around the beam sections, a fluorescent screen having a multiplicity of tri-color phosphor dot sets with the dots of each set symmetrically spaced the dots of each set being reepated in similar spacial array, and means to excite said deflector elements at recurrently successive time intervals under control of said color switching signals elements to cause each dot of a set to be successively excited only by a corresponding one of said beam sections.

15. A color television system comprising means to scan a colored subject matter to derive therefrom color switching signal elements interspersed between color analysis signal elements, means to receive and separate the color switching signal elements from the color analysis signal elements, a cathode-ray tube having an electron gun for developing a single cathode-ray beam, a single beam intensity control electrode upon which the color analysis signal elements are impressed, means to trisect the beam after leaving said gun, means to focus the trisected beam, means cooperating with said trisecting means for independently deflecting each of the trisected beam sections under control of said color switching signal elements to effectively remove at any given instant two of the trisected beam sections from the action of said focussing means, a multi-apertured baffle plate upon which the beam sections are arranged to be focussed, an image screen in the rear of said baffle plate and having a multiplicity of tri-color dot sets with the dots of each set symmetrically arranged around a corresponding aperture in the baffle plate whereby only one dot of each set can be excited by a corresponding one of the trisected beams.

16. A color television picture tube comprising: an evacuated envelope containing a screen having an instantaneous color-response characteristic to bombardment by electrons which is different for each of a number of different directions of convergence thereof upon the screen; an electron gun for projecting electrons toward said screen with their mean axis extending along a predetermined path in an initial portion thereof; and color switching means including as many individual deflection means as the number of said different convergent directions, each of the individual means being effective in a region near the end of said initial portion of said path to deflect electrons, which are moving therealong, in a respective one of at least three different predetermined outward radial directions with respect to said path each of which corresponds to a respective one of said directions of convergence.

17. A color television picture tube comprising: an evacuated envelope containing a directional polychromatic-emissive screen adapted to emit light of any one of a number of different colors in response to bombardment by electrons which impinge thereon in a corresponding one of an equal number of different convergent directions; a gun for projecting electrons toward said screen with their mean axis extending along a predetermined path in an initial portion thereof; electron optical means for causing electrons which diverge from said path in an intermediate portion thereof to converge upon said screen in a final portion thereof; and as many individual deflection means as said number of different colors, each of the deflection means being effective in said intermediate portion of said path to divert the mean axis of electrons in a respective one of at least three different predetermined outward radial directions, with respect to said path, each of which corresponds to a respective one of said different directions of convergence.

18. A picture tube comprising an evacuated envelope containing a directional screen having a plurality of picture-element areas, each including a plurality of subelementary fluorescent coatings, the directional screen being so arranged that at each picture-element area different ones of its sub-elementary coatings are selectively excited by beam electrons which converge upon said area in different radial directions; gun means for projecting electrons toward said directional screen with their mean axis extending along a predetermined path in an initial portion thereof; and direction-of-convergence control means including as many individual deflection means as the number of sub-elementary coatings in each picture element area, each of said deflection means being effective in a region near the end of said initial portion of said path to divert electrons in a respective one of at least three different predetermined outward radial directions, with respect to said path, each of which corresponds to a respective one of said directions of convergence.

19. A picture tube as in claim 18 in which said gun means has an electron cross-over point in said region near the end of the initial portion of said path.

20. A color television picture tube comprising an evacuated envelope containing a directional polychromatic-emissive screen having a plurality of picture-element areas and adapted to emit any one of three different colors from any of said areas in response to bombardment by electrons which impinge thereon in a corresponding one of three different convergent directions; gun means for projecting electrons toward said screen with their mean axis extending along a predetermined path in an initial portion thereof; and color switching means located in a region near the end of said path and including a separate deflection means for deflecting electrons in a different predetermined outward radial direction, with respect to said path, for each of said directions of convergence.

21. A color television tube as in claim 20 in which each of said separate deflection means comprises an electrostatic deflection plate which faces the corresponding plates of the other two separate deflection means with its inside surface disposed at an angle of sixty degrees with respect to the inside surface of each of said two plates.

22. A color television picture tube as in claim 20 in which said gun means is adapted to produce a cross-over of electrons in said region.

23. A color television picture tube comprising: an evacuated envelope containing a directional polychromatic-emissive screen having a plurality of picture-element areas and adapted to emit light of any one of a number of different colors at any of said areas in response to bombardment by electrons which impinge thereon in a corresponding one of an equal number of different convergent directions; means for producing an electron optic having an object axis and an image axis and disposed on the electron-approach side of said screen for causing electrons which diverge from said object axis in moving through the optic toward the screen to converge toward said image axis at a point near the screen; gun means for projecting electrons in a forward direction toward said optic along a path which coincides with an extension of said object axis in the opposite, rearward, direction; and color switching means located between the gun means and the means for producing an electron optic and including a separate deflection means for deflecting electrons in each of at least three different predetermined outward radial directions with respect to said path, each of which outward directions corresponds to a respective one of said different directions of convergence.

24. A color television picture tube as in claim 23 and further comprising scansion-deflection means for effectively varying periodically and in two coordinates the angular direction of said image axis with respect to said object axis whereby under control of said switching means and said scansion-deflection means electrons projected from said gun means at different times will have said different convergence directions for all of said picture-element areas.

References Cited in the file of this patent

UNITED STATES PATENTS

| | | |
|---|---|---|
| 2,253,292 | Goldsmith | Aug. 19, 1941 |
| 2,508,267 | Kasperowicz | May 16, 1950 |
| 2,532,511 | Okolicsanyi | Dec. 5, 1950 |
| 2,581,487 | Jenny | Jan. 8, 1952 |
| 2,587,074 | Sziklai | Feb. 26, 1952 |
| 2,638,499 | Evans | May 12, 1953 |

FOREIGN PATENTS

| | | |
|---|---|---|
| 443,896 | Great Britain | Mar. 10, 1936 |
| 866,065 | France | June 16, 1941 |